United States Patent
Sevindik et al.

(10) Patent No.: US 11,140,606 B2
(45) Date of Patent: Oct. 5, 2021

(54) LOCATION-BASED TRACKING IN A WIRELESS NETWORK ENVIRONMENT

(71) Applicant: Charter Communications Operating, LLC, St. Louis, MO (US)

(72) Inventors: Volkan Sevindik, Reston, VA (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/684,548

(22) Filed: Nov. 14, 2019

(65) Prior Publication Data

US 2021/0153092 A1 May 20, 2021

(51) Int. Cl.
| | |
|---|---|
| *H04W 36/32* | (2009.01) |
| *H04W 4/029* | (2018.01) |
| *H04W 80/02* | (2009.01) |
| *H04W 64/00* | (2009.01) |
| *H04W 72/04* | (2009.01) |
| *H04W 8/16* | (2009.01) |

(52) U.S. Cl.
CPC .......... *H04W 36/32* (2013.01); *H04W 4/029* (2018.02); *H04W 8/16* (2013.01); *H04W 64/003* (2013.01); *H04W 72/0453* (2013.01); *H04W 80/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0060174 | A1* | 3/2007 | Newton | H04W 4/029 |
| | | | | 455/456.5 |
| 2009/0280834 | A1* | 11/2009 | Gill | H04W 60/02 |
| | | | | 455/456.5 |
| 2016/0302064 | A1* | 10/2016 | Tsai | H04W 12/0602 |
| 2016/0307195 | A1* | 10/2016 | Cantwell | H04L 69/08 |
| 2018/0054840 | A1* | 2/2018 | Fitch | H04W 76/11 |
| 2018/0109320 | A1* | 4/2018 | Van Schaik | H04B 10/25753 |

* cited by examiner

*Primary Examiner* — Jinsong Hu
*Assistant Examiner* — Farideh Madani
(74) *Attorney, Agent, or Firm* — Armis IP Law, LLC

(57) ABSTRACT

A communication system includes a base station disposed in a wireless network environment. During operation, the base station receives a first message communicated over a first fixed wireless access communication link from a mobile communication device. The base station receives a second message communicated over a second fixed wireless access communication link from the mobile communication device. Via the first message and the second message, the base station tracks a current location of the mobile communication device in the wireless network environment.

36 Claims, 12 Drawing Sheets

**LOCATION
TRACKING
INFORMATION
170-1**

CPE 121 (CONNECTED TO WBS 130-1)
ID = CPE1
LOCN = LAT1, LONG1

**MCD 150-1
ID = UE1
LOCN(UE1) = (LAT = X11, LONG = Y11)
WAP1**

MCD 150-2
ID = UE2
LOCN(UE2) = (LAT = X21, LONG = Y22)
WAP1

CPE 122 (CONNECTED TO WBS 130-1)
ID = CPE2
LOCN = LAT2, LONG2

MCD 150-3
ID = UE3
LOCN(UE3) = (LAT = X31, LONG = Y31)
WAP2

CPE 123 (CONNECTED TO WBS 130-2)
ID = CPE3
LOCN = LAT3, LONG3

MCD 150-4
ID = UE4
LOCN(UE4) = (LAT = X41, LONG = Y41)
WAP3

LOCATION-BASED TRACKING IN A WIRELESS NETWORK ENVIRONMENT

BACKGROUND

Conventional wireless networks typically include one or more wireless stations to provide mobile communication devices access to a remote network such as the Internet. One type of wireless station is a so-called CBSD (Citizen Broadband Radio Service Device).

In an example CBRS (Citizens Band Radio Service) network, each CBSD (Citizen Broadband Radio Service Device) is assigned a certain amount of wireless spectrum from an entity such as a Spectrum Access Service (SAS).

One network communication standard supported by a CBSD is LTE (Long Term Evolution). According to the LTE standard, a certain part of the spectrum is utilized to transmit control channel information.

Certain conventional implementations of wireless base stations include providing wireless network connectivity to a customer via a so-called fixed wireless access link. In such an instance, a wireless base station establishes a respective fixed wireless access communication link with customer premises equipment at a subscriber's residence. The wireless connectivity between the wireless base station and the customer premises equipment enables the user at the residence to access a remote network.

BRIEF DESCRIPTION OF EMBODIMENTS

In contrast to conventional techniques, embodiments herein provide novel ways of providing improved wireless communications to one or more mobile communication devices in a network environment.

For example, one embodiment herein includes a base station disposed in a wireless network environment. The base station is operative to receive a first message communicated over a first fixed wireless access communication link. The first message originates from a mobile communication device being tracked. The base station receives a second message communicated over a second fixed wireless access communication link. The second message also originates from the mobile communication device. Via the first message and the second message, the base station tracks a current location of the mobile communication device in the wireless network environment.

In accordance with further embodiments, a processing entity such as the base station (or other suitable resource) processes the first message and the second message. Based on analysis of the first message, the base station (communication processing entity) detects that the mobile communication device resides at a first location. The communication processing entity (such as base station) communicates notification of the first location and a unique identifier value of the mobile communication device to a remote communication management resource. Based on analysis of the second message, the communication processing entity detects that the mobile communication device resides at a second location. The base station communicates notification of the second location and the unique identifier value of the mobile communication device from the base station to the communication management resource.

In yet further example embodiments, the first fixed wireless access communication link is established between the base station and first customer premises equipment disposed in a first subscriber domain of the wireless network environment; the second fixed wireless access communication link is established between the base station and second customer premises equipment disposed in a second subscriber domain of the wireless network environment.

The system resources associated with the wireless network environment as described herein can be implemented in any suitable manner. In one embodiment, each of the base station, the first customer premises equipment, and the second customer premises equipment register with a bandwidth management resource to communicate in the wireless network environment. In one example embodiment, the bandwidth management resource is a so-called SAS (Spectrum Access System) that coordinates communications in accordance with a CBRS (Citizen Band Radio System) wireless communication protocol.

In accordance with still further embodiments, the first fixed wireless access communication link (such as between the first customer premises equipment and the base station) and the second fixed wireless access communication link (such as between the second customer premises equipment and the base station) support wireless communications in accordance with a first wireless communication protocol. The first customer premises equipment and second customer premises equipment support wireless communications in accordance with a second wireless communication protocol to the mobile communication device.

Further embodiments herein include novel encoding of messages. For example, in accordance with further embodiments, the first message from the mobile communication device is encoded in accordance with a first wireless communication protocol; the first message is communicated from the mobile communication device to a first wireless station. The first customer premises equipment communicates the received first message over the first fixed wireless access communication link in accordance with a second wireless communication protocol to the base station. In a similar manner, the second message is encoded in accordance with the first wireless communication protocol; the second message is communicated from the mobile communication device to a second wireless station that communicates the second message over the second fixed wireless access communication link in accordance with the second wireless communication protocol to the base station.

In yet further example embodiments, a portion of the first message communicated via the first wireless communication protocol is encoded in accordance with the second wireless communication protocol. A portion of the second message communicated via the first wireless communication protocol is encoded in accordance with the second wireless communication protocol.

In accordance with still further embodiments, the portion of the first message includes: i) a unique identifier value assigned to the mobile communication device, and ii) location information indicating a first location in which the mobile communication device resides at a first instant in time; the portion of the second message includes: i) a unique identifier value assigned to the mobile communication device, and ii) location information indicating a second location in which the mobile communication device resides at a second instant in time.

In accordance with further example embodiments, the first message is encoded in accordance with a first wireless communication protocol; the first message being encoded with an indication that that the first message includes a portion of data decodable via a second wireless communication protocol. As previously discussed, the portion of data associated with the first message includes: i) a unique identifier value assigned to the mobile communication device, and ii) location information indicating a first (current) location of the mobile communication device in the wireless network environment.

In a similar manner, the second message is encoded in accordance with a first wireless communication protocol; the second message being encoded with an indication that that the second message includes a portion of data decodable via a second wireless communication protocol. As previously discussed, the portion of data associated with the second message includes: i) a unique identifier value assigned to the mobile communication device, and ii) location information indicating a first (current) location of the mobile communication device in the wireless network environment.

Further embodiments herein include initiating a handoff of the mobile communication device from first customer premises equipment to second customer premises equipment; the first customer premises equipment is in communication with the base station over the first fixed wireless access communication link. The second customer premises equipment is in communication with the base station (or another base station) over the second fixed wireless access communication link. Yet further example embodiments herein initiating the handoff in response to detecting movement of the mobile communication device from a region of wireless coverage provided by the first customer premises equipment to a region of wireless coverage provided by the second customer premises equipment.

Embodiments herein are useful over conventional techniques. For example, embodiments herein enable novel tracking of mobile communication devices in wireless network environments implementing fixed wireless access to respective subscribers. More specifically, in one embodiment, so-called tracking area (TA) updates are used to inform a respective MME (Mobile Management Entity, such as a communication management resource) of the last location that a respective mobile communication device (a.k.a., user equipment or UE) is detected as being present by the wireless system. In one embodiment, the user equipment (mobile communication device being tracked) sends periodic or occasional tracking area (TA) update messages to MME. In such an instance, the MME at least knows of the respective approximate location of the user equipment. During conditions in which a data call is directed to the UE, the communication management resource (MME) sends paging messages to a respective wireless base station (such as CBSD or CBSDs) which serve the area that is reported by the tracked user equipment. In this manner, the wireless system tracks respective user equipment is tracked and is able to route call alerts or other notifications to the user equipment because it is known where the user equipment resides.

In one embodiment, via user equipment tracking, user equipment can be handed off from first customer premises equipment to second customer premises equipment without terminating a respective wireless communication session.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and mobile communication device tracking in a network environment. The instructions, when executed by computer processor hardware, cause the computer processor hardware (such as one or more co-located or disparately processor devices or hardware) to: receive a first message communicated over a first fixed wireless access communication link, the first message originating from a mobile communication device; receive a second message communicated over a second fixed wireless access communication link, the second message originating from the mobile communication device; and via the first message and the second message, tracking a current location of the mobile communication device in the wireless network environment.

Another embodiment includes a computer readable storage medium and/or system having instructions stored thereon to facilitate wireless communications and mobile communication device tracking in a network environment. The instructions, when executed by computer processor hardware, cause the computer processor hardware (such as one or more co-located or disparately processor devices or hardware) to: retrieve data associated with the mobile communication device; produce a communication in accordance with a first wireless communication protocol; and encode a portion of the communication to be decodable via a second wireless communication protocol, the portion of the communication including the data.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 3 is an example diagram illustrating location tracking information according to embodiments herein.

Figure 1:
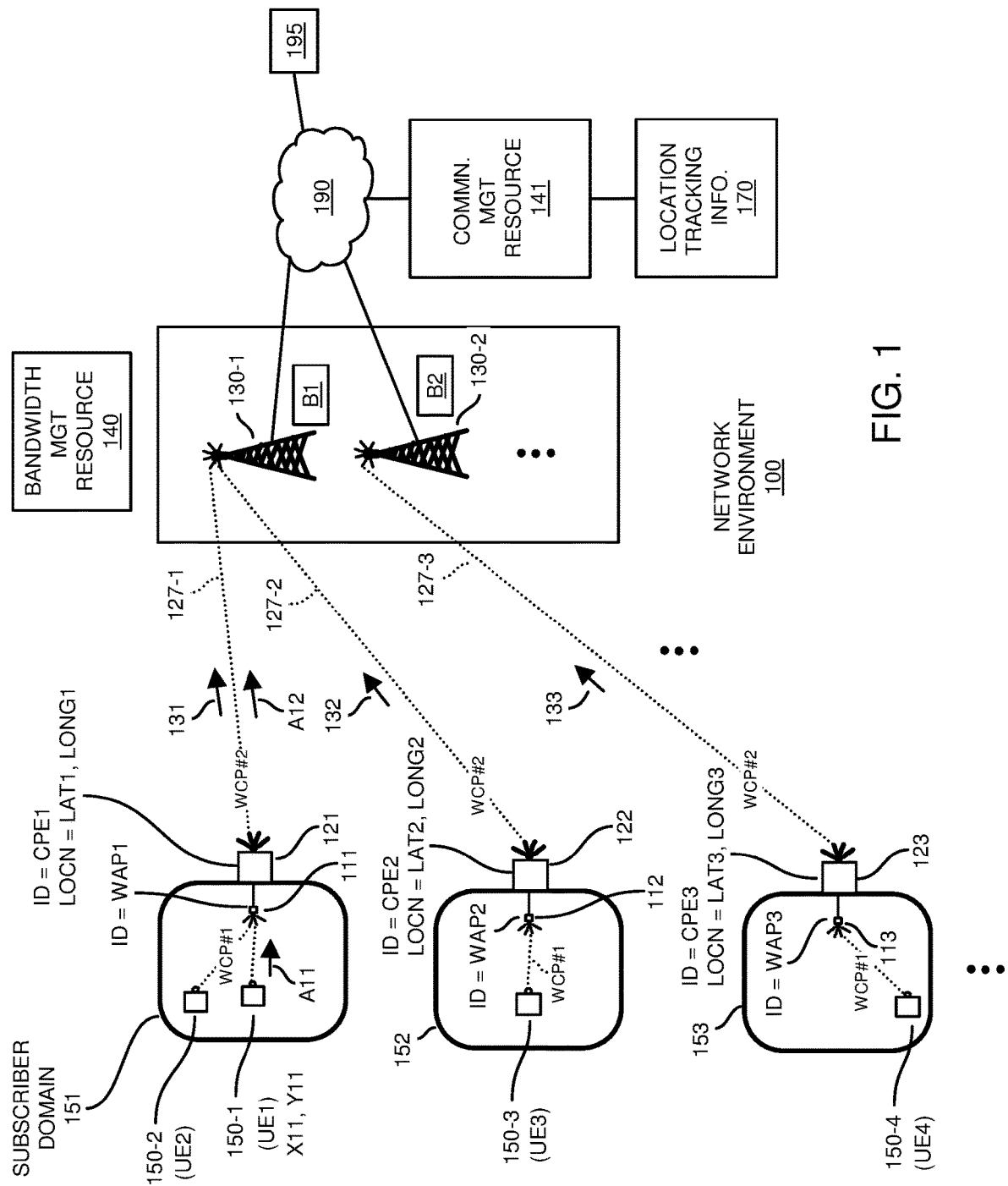
FIG. 1 is an example diagram illustrating a wireless network environment and user equipment tracking according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a communication system includes multiple base stations disposed in a wireless network environment. During operation, a first base station receives a first message communicated over a first fixed wireless access communication link from a mobile communication device. The first base station additionally receives a second message communicated over a second fixed wireless access communication link from the mobile communication device. The first base station communicates the first and second messages (or data obtained from the messages) and communicates such information to a communication management resource. Via the first message and the second message, the first base station and/or communication management resource, individually or combined, track a current location of the mobile communication device in the wireless network environment.

Now, more specifically, FIG. 1 is an example diagram illustrating a wireless network environment and user equipment tracking according to embodiments herein.

As shown, network environment 100 includes multiple subscriber domains 151, 152, 153, etc., multiple wireless stations 121, 122, 123, etc., multiple wireless access points 111, 112, 113, etc., multiple base stations 130-1, 130-2, etc., bandwidth management resource 140, and a control management resource 141.

Note that each of the resources in network environment 100 can be configured to include or be configured as appropriate hardware, software, or combination of hardware and software to carry out respective operations as discussed herein.

More specifically, the bandwidth management resource 140 as described herein can be implemented via respective bandwidth management hardware and/or bandwidth management software; the communication management resource 141 can be implemented via respective communication management hardware and/or communication management software; each mobile communication device (150-1, 150-2, 150-3, etc.) can be implemented via respective mobile communication hardware and/or mobile communication software; each wireless access point (such as 111, 112, 113, etc.) can be implemented via respective wireless access point hardware and/or wireless access point software; each wireless station (such as 121, 122, 123, etc.) can be implemented via respective wireless station hardware and/or wireless station software; each wireless base station (such as 130-1, 130-2, etc.) can be implemented via respective wireless base station hardware and/or wireless base station software; etc.

In one embodiment, each of the wireless stations 111, 112, 113, etc., resides at any suitable fixed location as on a rooftop or other suitable location of a house or entity associated with the respective subscriber domain.

As previously discussed, the system resources (such as wireless access points, wireless stations, wireless base stations, etc.) associated with the wireless network environment as described herein can be implemented in any suitable manner. In one embodiment, each of the base stations 130-1, 130-2, etc., the first wireless station 121, second wireless station 122, third wireless station, etc., register with a bandwidth management resource 140 for allocation of CBRS channels to communicate in the wireless network environment 100. In one example embodiment, the bandwidth management resource 141 is a so-called SAS (Spectrum Access System) that coordinates communications associated with the wireless stations 121, 122, 123, etc., and wireless base station 130-1, 130-2, etc., in accordance with a CBRS (Citizen Band Radio System) wireless communication protocol (such as supporting an LTE-type wireless communication protocol).

Each subscriber domain is connected to a respective wireless base station via wireless connectivity.

For example, communication link 127-1 (such as a fixed wireless access communication link or other suitable communication link) provides wireless connectivity between the wireless base station 130-1 and the wireless station 121 (assigned identity=CPE1 and residing at location latitude=LAT1, longitude=LONG1) associated with subscriber domain 151.

As further shown, mobile communication devices 150-1, 150-2, etc., in subscriber domain 151 wirelessly communicate via a first wireless communication protocol WCP #1 over respective wireless connectivity to the wireless access point 111 (assigned identity WAP1). Mobile communication device 150-1 (identity=UE1) is disposed at location latitude=X11, longitude=Y11 in the subscriber domain 151. Assume that the mobile communication device 150-2 (identity=UE2) is disposed at location latitude=X21, longitude=Y21 in the subscriber domain 151.

Communication link 127-2 (such as a fixed wireless access communication link or other suitable communication link) provides wireless connectivity between the wireless base station 130-1 and the wireless station 122 (assigned identity=CPE2 and residing at location latitude=LAT2, longitude=LONG2) associated with subscriber domain 152. As further shown, mobile communication devices 150-3 in subscriber domain 152 wirelessly communicates via a first wireless communication protocol WCP #1 (such as WiFi™ or other suitable wireless communication protocol) over respective wireless connectivity with the wireless access point 112 (assigned identity WAP2). Assume that the mobile communication device 150-3 (identity=UE3) resides at location latitude=X31, longitude=Y31 in the subscriber domain 152.

Communication link 127-3 (such as a fixed wireless access communication link or other suitable communication link) provides wireless connectivity between the wireless base station 130-2 and the wireless station 123 (assigned identity=CPE3 and residing at location latitude=LAT3, longitude=LONG3) associated with subscriber domain 153. As further shown, mobile communication devices 150-4 in subscriber domain 154 wirelessly communicates via a first wireless communication protocol WCP #1 (such as WiFi™ or other suitable wireless communication protocol) over respective wireless connectivity with the wireless access point 113 (assigned identity WAP3). Mobile communication device 150-4 (identity=UE4) is disposed at a corresponding location in the subscriber domain 153.

To access network 190, each mobile communication device establishes a respective wireless communication link with a wireless access point in a respective subscriber domain.

More specifically, via the first wireless communication protocol WCP1, the mobile communication device 150-1 establishes a respective wireless communication link with the wireless access point 111. The wireless access point 111 is communicatively coupled (such as via a physical or wireless link) to wireless station 121 (such as customer premises equipment). The wireless station 121 receives communications from wireless access point 111 and wirelessly communicates the received messages (associated with mobile communication device 150-1) over a respective wireless communication link 127-1 (such as a fixed wireless access link) to wireless base station 130-1. The wireless base station 130-1 forwards communications to an appropriate one or more destinations (such as server resources 195) in the network 190.

In a reverse direction, the one or more server resources 195 in network 190 communicate reply messages (such as including one or more data packets) to a respective destination mobile communication device. For example, network 190 conveys reply messages as received over network 190 (and that are destined for delivery to mobile communication device 150-1) to wireless base station 130-1. The wireless base station 130-1 wirelessly communicates the reply messages wirelessly to wireless station 121 in subscriber domain 130-1. The wireless station 121 forwards the reply messages to wireless access point 111 that further wirelessly communicates the reply messages to the appropriate destination mobile communication device 150-1.

As previously discussed, embodiments herein provide novel ways of tracking each of multiple mobile communication devices in the wireless network environment 100. For example, embodiments herein enable novel tracking of mobile communication devices in wireless network environments implementing fixed wireless access to respective subscribers.

Brief Description of Operations Supporting User Equipment Location Tracking

Operation 1—Each wireless station 121, 122, 123, etc. (such as customer premises equipment) and wireless base stations 130-1, 130-2, etc., (such as CBSDs) registers with the bandwidth management resource 140 (such as a Spectrum Access System) for channel allocation. They share use of available wireless channels.

Operation 2—Each mobile communication device 150 establishes a respective wireless connection with a wireless access point in a subscriber domain.

Operation 3—Each mobile communication device 150 generates and communicates (via a first wireless communication protocol) tracking update messages to a respective wireless access point. In one embodiment, the tracking updated messages are encoded in accordance with a second wireless communication protocol (such as LTE-decodable messages in accordance with a second wireless communication protocol) so that wireless base stations 130 can identify and decode these messages.

Operation 4—The wireless access points forward the location tracking messages from the mobile communication devices to the wireless stations (such as customer premises equipment). The wireless stations (customer premises equipment) forward the location tracking messages to the wireless base stations. The wireless stations also send notification to the wireless base station of their respective CPE ID, LAT, and LONG information.

Operation 5—The LTE decodable message from the mobile communication devices include data fields populated with location tracking information such as UE HW ID, LAT, LONG, Wifi AP ID, LTE Decodable Field (Yes/No) such as notification 210. Setting of the notification 210 indicates whether the location tracking information message is decodable by the second wireless communication protocol.

Operation 6—The wireless base stations 130 decode the location tracking messages (LTE decodable messages) with Decodable Field set to a value of YES. After the wireless base station 130 decodes the one or more messages, the wireless base station 130 communicates the tracking update messages (and/or corresponding information) to the communication management resource 141 (such as an MME). The communication management resource 141 stores the information as location tracking information 170 and updates as the mobile communication devices send the updated location tracking information.

Operation 7—Assume that the mobile communication device 150 moves to a new location.

Operation 8—The mobile communication device 150 sends the new tracking area message information to the wireless base station 130. The wireless base station 130 initiates updating the location of the respective mobile communication device via notifying the communication management resource 141 of the new location of the respective mobile communication device.

Operation 9—The new wireless station (such as customer premises equipment) sends its CPE ID, LAT, and LONG to the wireless base station 130.

Operation 10—The wireless base station sends any data packets associated with the mobile communication device 150 to the customer premises equipment (known through CPE ID) that serves the mobile communication device at the new location.

Operation 11—During mobility, when the mobile communication device drops a wireless connection with the current wireless access point, and prior to the mobile communication device connecting with another wireless access point in the new subscriber domain; the packets are buffered in the wireless base station 130 (such as via buffer B1 or B2) that serves the mobile communication device. Buffered packets in respective one or more buffer are sent to the new wireless station after the mobile communication device connects with wireless access point in the new subscriber domain.

Operation 12—Via updating of the location tracking information 170 to indicate the current location of the mobile communication device and connectivity as described herein, the communication management resource 141 is able to identify a location of a mobile communication device and forward messages, alerts, incoming calls, buffered data, etc., over the appropriate communication path such as combination of wireless base station, wireless station, wireless access point, etc., to a target mobile communication device.

Figure 2:
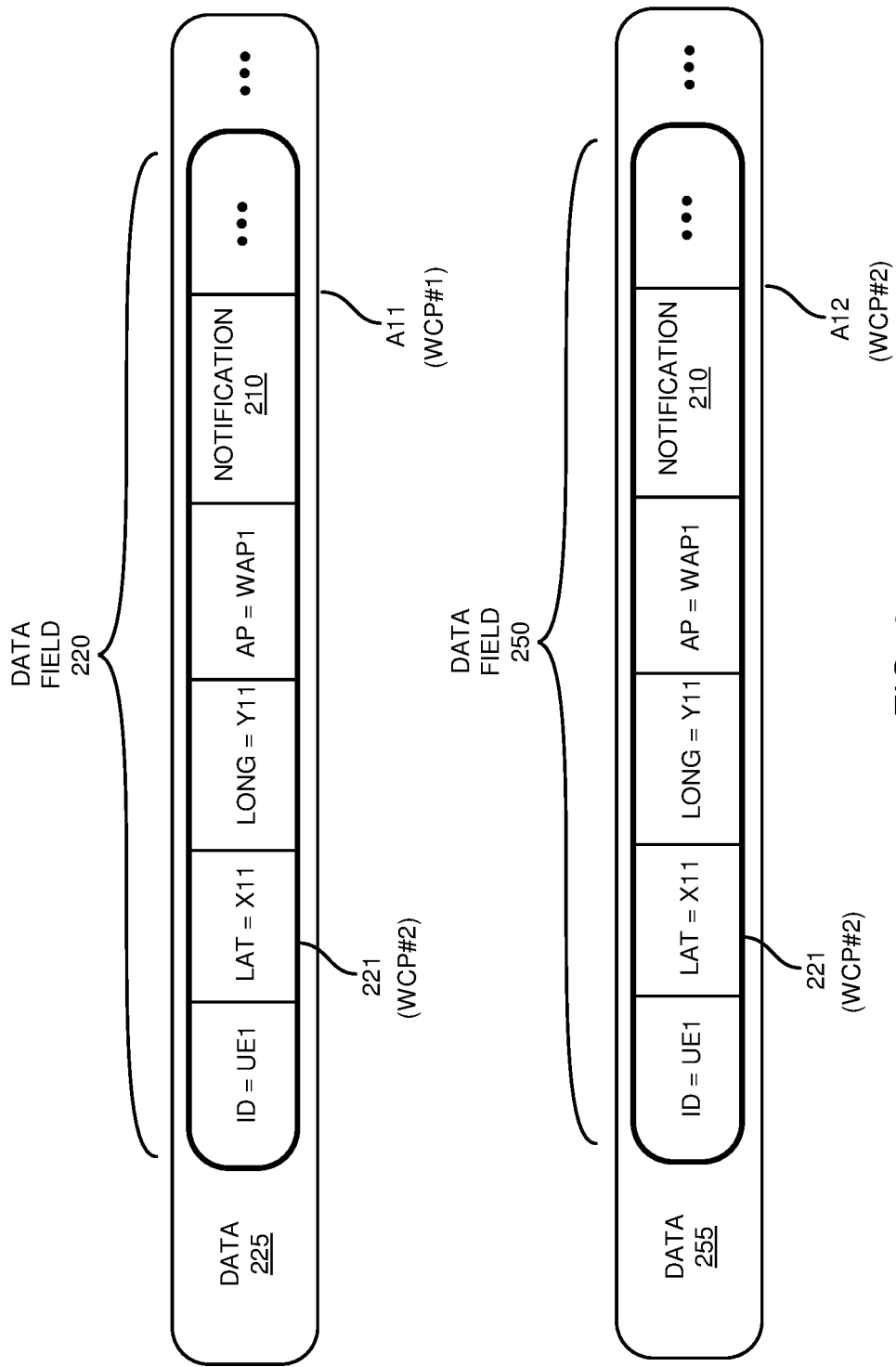
FIG. 2 is an example diagram illustrating wireless communications according to embodiments herein.

FIG. 2 is an example diagram illustrating wireless communications according to embodiments herein.

This example embodiment illustrates details of communication A11 (between a mobile communication device and a wireless access point) and communication A12 (between a wireless station such as customer premises equipment and a wireless base station such as CBSD).

As shown, and as previously discussed, communication A11 (wirelessly transmitted from the mobile communication device 150-1 to the wireless access point 111) is encoded in accordance with wireless communication protocol WCP1 and includes data field 220 as well as supplemental data 225 (such as source information, destination information, etc.).

Data field 220 can be tagged to indicate presence of message 221; data field 220 can be a portion of the communication A11 reserved for location tracking information, etc.

In this example embodiment, the mobile communication device 150-1 retrieves respective location tracking information and populates the data field 220 of communication A12 to include a message 221 (such as encoded in accordance with an LTE or second wireless communication protocol, WCP2). The message 221 is a decodable message (via wireless communication protocol WCP2) enabling location tracking of the mobile communication device 150-1. More specifically, the mobile communication device 150-1 originating the communication A11 populates the data field 220 (message 221 encoded in accordance with the second wireless communication protocol WCP2) to include an identity of the mobile communication device 150-1 (i.e., UE1), location information such as latitude=X11 and longitude=Y11 indicating a current location of the mobile communication device 150-1, an identity of a respective wireless access point (namely, WAP1) to which the mobile communication device 150-1 is wirelessly connected, and notification 210. Again, communication A11 is encoded in accordance with wireless communication protocol WCP1.

Note that the location information can be any suitable information. In one embodiment, the mobile communication device 150-1 includes circuitry to generate respective location information such as GPS (Global Positioning System) information indicating a current location of the mobile communication device 150-1.

As further shown, communication A12 (wirelessly transmitted from the wireless station 121 to the wireless base station 130-1) is encoded in accordance with wireless communication protocol WCP2 and includes data field 250 as well as supplemental data 255 (such as source information, destination information, etc.).

Data field 250 can be tagged to indicate presence of message 221; data field 250 can be a portion of the communication A12 reserved for location tracking information, etc.

In this example embodiment, the wireless station (such as customer premises equipment) populates the data field 250 of communication A12 to include the message 221 (location tracking information such as encoded via an LTE or second wireless communication protocol, WCP2) as retrieved from the received communication A11. The data field 250 in the communication A12 includes information such as an identity of the mobile communication device 150-1 (i.e., identity=UE1), location information such as latitude=X11 and longitude=Y11 indicating a current location of the mobile communication device 150-1, an identity of a respective wireless access point (namely, WAP1) to which the mobile communication device 150-1 is wirelessly connected, and notification 210.

Upon receipt of the communication A12, the wireless base station 130-1 detects, via notification 210 set to YES, that the message 221 is decodable in accordance with the second wireless communication protocol WCP2. In such an instance, because the message 221 is detected as being decodable, the wireless base station 130-1 (such as CBSD) retrieves the respective message 221 and decodes it based on the wireless communication protocol WCP2 (such as LTE or other suitable wireless communication protocol). Based on decoding and analysis, the wireless base station 130-1 learns of information such as: i) a current location of the mobile communication device 150-1, ii) a wireless access point to which the mobile communication device 150-1 is wirelessly connected, etc.), etc. The wireless base station 130-1 communicates the retrieved location tracking information associated with message 221 to the communication management resource 141.

Communication management resource 141 uses the received information associated with message 221 to produce/update the location tracking information 170 as shown in FIG. 3.

FIG. 3 is an example diagram illustrating location tracking information according to embodiments herein.

As previously discussed, via information received from the wireless base stations, the communication management resource 141 produces location tracking information 170-1 associated with the mobile communication device 150-1. The communication management resource generates location tracking information 170-1 based on location tracking information received from each of the mobile communication devices.

For example, as shown in FIG. 3, based on information provided by each of the wireless stations (customer premises equipment), the location tracking information 170-1 (such as hierarchical connectivity tree indicates that the wireless station 121 (such as first customer premises equipment having identity=CPE1) is wirelessly connected to the wireless base station 130-1, the wireless station 122 (such as second customer premises equipment having identity=CPE2) is wirelessly connected to the wireless base station 130-1, the wireless station 123 (such as third customer premises equipment having identity=CPE3) is wirelessly connected to the wireless base station 130-2, and so on.

Based on location tracking information received from each of the mobile communication devices, the communication management resource 141 generates the location tracking information 170-1 to indicate that the mobile communication device 150-1 (UE1) resides at location latitude=X11 and longitude=Y11 and is connected to wireless access point 111 (WAP1) in subscriber domain 151. The location tracking information 170-1 further indicates that the mobile communication device 150-2 (UE2) at location latitude=X21 and longitude=Y21 is connected to wireless access point 111 (WAP1) in subscriber domain 151. Thus, wireless access point 111 (WAP1) connects both of the mobile communication devices 150-1 and 150-2 to the wireless station 121 (CPE1).

The location tracking information 170-1 further indicates that the mobile communication device 150-3 (UE3) at location latitude=X31 and longitude=Y31 is connected to wireless access point 112 (WAP2) in subscriber domain 152. Thus, wireless access point 112 (WAP2) connects the mobile communication device 150-3 to the wireless station 122 (CPE2).

The location tracking information 170-1 further indicates that the mobile communication device 150-4 (UE3) at location latitude=X41 and longitude=Y41 is connected to wireless access point 113 (WAP3) in subscriber domain 153. Thus, wireless access point 113 (WAP3) connects the mobile communication device 150-4 to the wireless station 123 (CPE3).

Figure 4:
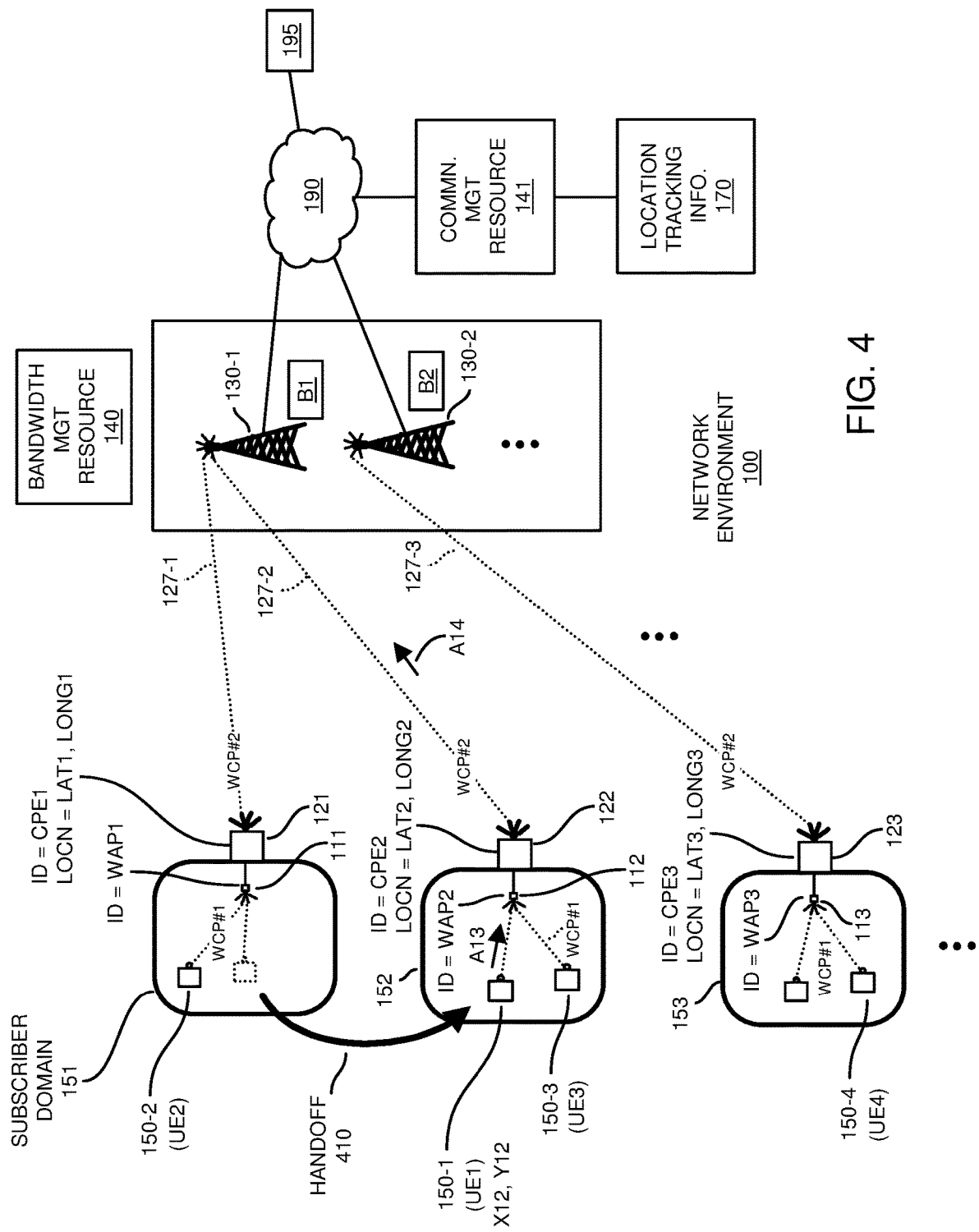
FIG. 4 is an example diagram illustrating a handoff and mobile communication device tracking according to embodiments herein.

FIG. 4 is an example diagram illustrating a handoff and tracking of a mobile communication device according to embodiments herein.

In accordance with further embodiments, the wireless base stations 130 buffer data (via one or more buffers B1, B2, etc.) associated with the mobile communication devices in case of a respective handoff.

For example, assume that the mobile communication device 150-1 moves from subscriber domain 151 to subscriber domain 152 as shown. In one embodiment, the mobile communication device 150-1 and/or wireless access points 111/112 initiate a handoff 410 in response to detecting that the wireless access point 112 is able to provide a better wireless connection to the mobile communication device 150-1.

In one embodiment, the buffer B1 stores communication session information associated with a communication session between the wireless base station 130-1 and the mobile communication device 150-1. For example, after termination of the wireless connectivity with the wireless station 130-1 through the wireless station 121, the wireless base station 130-1 buffers data associated with the communication session. After the handoff 410, and after the mobile communication device 150-1 establishes the wireless communication link (via respective wireless connectivity supporting the wireless communication protocol WCP1) with the wireless access point 112, the wireless base station 130-1 communicates buffered data in buffer B1 associated with the communication session to the mobile communication device 150-1.

In a similar manner as previously discussed, the mobile communication device 150-1 repeatedly communicates updated location information to the wireless access point 112 via communication A13. The wireless station 122 communicates the updated location tracking information from the mobile communication device 1501 to the wireless base station 130-1 via communication A14 (second wireless communication protocol WCP2).

Figure 5:
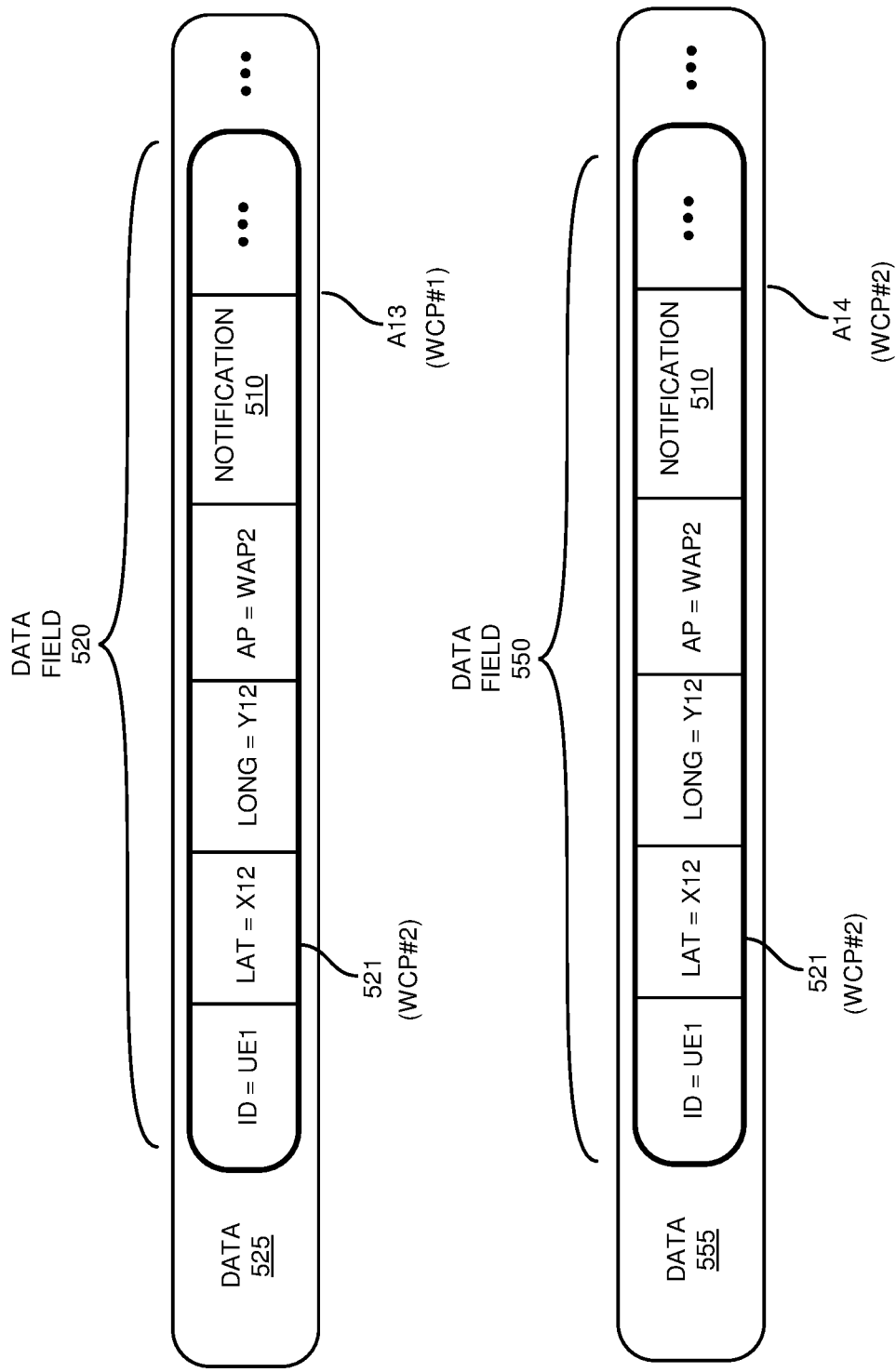
FIG. 5 is an example diagram illustrating wireless communications according to embodiments herein.

FIG. 5 is an example diagram illustrating wireless communications according to embodiments herein.

This example embodiment illustrates details of communication A13 (between mobile communication device 150-1 and wireless access point 112) and communication A14 (from wireless station such as customer premises equipment 122 to wireless base station 130-1 such as a CBSD).

Communication A13 (wirelessly transmitted from the mobile communication device 150-1 to the wireless access point 112) is encoded in accordance with wireless communication protocol WCP1 and includes data field 520 as well as supplemental data 525 (such as source information, destination information, etc., for routing).

Data field 520 can be tagged to indicate presence of message 521; data field 520 can be a portion of the communication A13 reserved for location tracking information, etc.

In this example embodiment, the mobile communication device 150-1 populates the data field 520 to include a message 521 (such as encoded in accordance with an LTE or second wireless communication protocol, WCP2) enabling location tracking of the mobile communication device 150-1. More specifically, the mobile communication device 150-1 originating the communication A13 populates the data field 520 (message 521 encoded in accordance with the second wireless communication protocol WCP2) to include an identity of the mobile communication device 150-1 (i.e., identity=UE1), location information such as latitude=X12 and longitude=Y12 indicating a current location of the mobile communication device 150-1 in subscriber domain 152, an identity of a respective wireless access point (namely, WAP2) to which the mobile communication device 150-1 is wirelessly connected, and notification 510.

As previously discussed, note again that the location information can be any suitable information. In one embodiment, the mobile communication device 150-1 include circuitry to generate respective location information such as GPS (Global Positioning System) information indicating a current location of the mobile communication device 150-1.

Communication A14 (wirelessly transmitted from the wireless station 122 to the wireless base station 130-1) is encoded in accordance with wireless communication protocol WCP2 and includes data field 550 as well as supplemental data 555 (such as source information, destination information, header information, etc., for routing).

Data field 550 can be tagged to indicate presence of message 221; data field 550 can be a portion of the communication A14 reserved for location tracking information, etc.

In this example embodiment, the wireless station 121 populates the data field 550 of communication A14 to include the message 521 (location tracking information such as encoded via an LTE or second wireless communication protocol, WCP2) retrieved from the received communication A13. The data field 550 in the communication A14 includes an identity of the mobile communication device 150-1 (i.e., UE1), location information such as latitude=X12 and longitude=Y12 indicating a current location of the mobile communication device 150-1, an identity of a respective wireless access point (namely, WAP2) to which the mobile communication device 150-1 is wirelessly connected, and notification 510.

Upon receipt of the communication A14, the wireless base station 130-1 detects, via notification 210 set to YES, that the message 520 in communication A14 is decodable in accordance with the second wireless communication protocol WCP2. In such an instance, because the message 521 is detected as being decodable, the wireless base station 130-1 (such as CBSD) retrieves the respective message 521 and decodes it based on the wireless communication protocol WCP2 (such as LTE or other suitable wireless communication protocol). Based on decoding and analysis, the wireless base station 130-1 learns of location tracking information such as: i) a current location (X12, Y12) of the mobile communication device 150-1, ii) wireless access point to which the mobile communication device 150-1 is wirelessly connected, etc.

The wireless base station 130-1 communicates the retrieved information associated with message 521 in data field 550 or message 521 itself to the communication management resource 141. Communication management resource 141 uses the received information associated with message 521 to produce/update the location tracking information 170 as shown in FIG. 6 in a similar manner as previously discussed.

Figure 6:
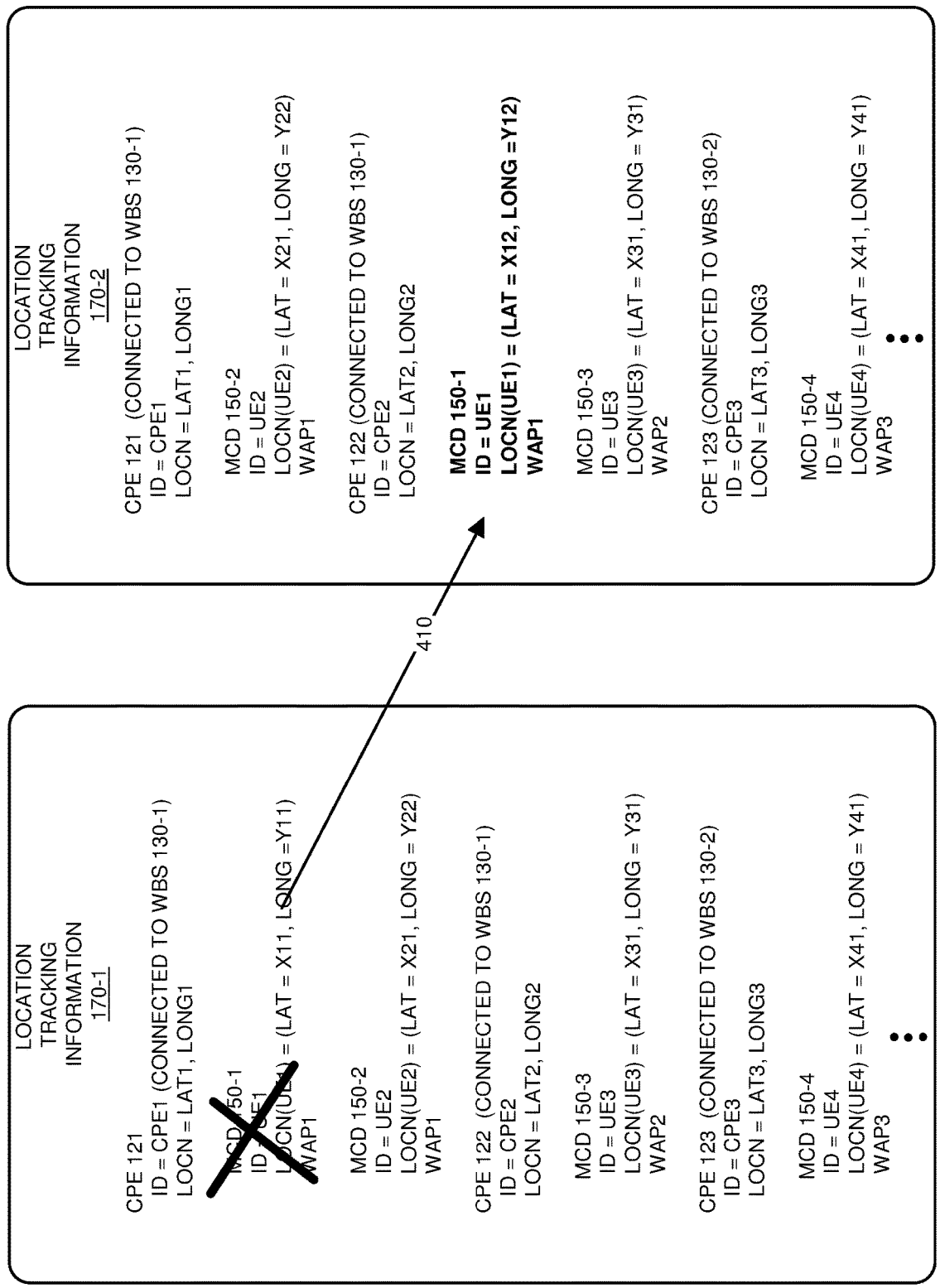
FIG. 6 is an example diagram illustrating updating of location tracking information according to embodiments herein.

FIG. 6 is an example diagram illustrating updating of location tracking information according to embodiments herein.

As previously discussed, via information received from the wireless base stations, the communication management resource 141 produces location tracking information 170-2 associated with the mobile communication devices.

In this example embodiment, in a similar manner as previously discussed, the location tracking information 170-2 indicates that the wireless station 121 (such as first customer premises equipment having identity=CPE1) is wirelessly connected to the wireless base station 130-1, the wireless station 122 (such as first customer premises equipment having identity=CPE2) is wirelessly connected to the wireless base station 130-1, the wireless station 123 (such as first customer premises equipment having identity=CPE1) is wirelessly connected to the wireless base station 130-2, and so on.

The location tracking information 170-1 further indicates the new location condition in which the mobile communication device 150-1 (UE1) at location latitude=X12 and longitude=Y12 is now connected to wireless access point 112 (WAP2) in subscriber domain 151. Thus, via update of the location tracking information 170-1 to location tracking information 170-2, the communication management resource 141 tracks the new location and corresponding connectivity of the mobile communication device 150-1 as well as each of the other mobile communication devices and customer premises equipment.

Thus, via the location tracking information 170-2, the communication management resource 141 knows that the mobile communication device 150-1 resides at location X2, Y12; the communication management resource 141 further knows that the mobile communication device 150-1 is connected to the wireless access point 112 (WAP1); the communication management resource 141 further knows that communications associated with the mobile communication device 150-1 are supported via the wireless station 122 (CPE2). Accordingly, via location tracking information 170-2, the communication management resource 141 is able to route any new messages or alerts to the mobile communication device 150-1 and each of the other mobile communication devices.

Figure 7:
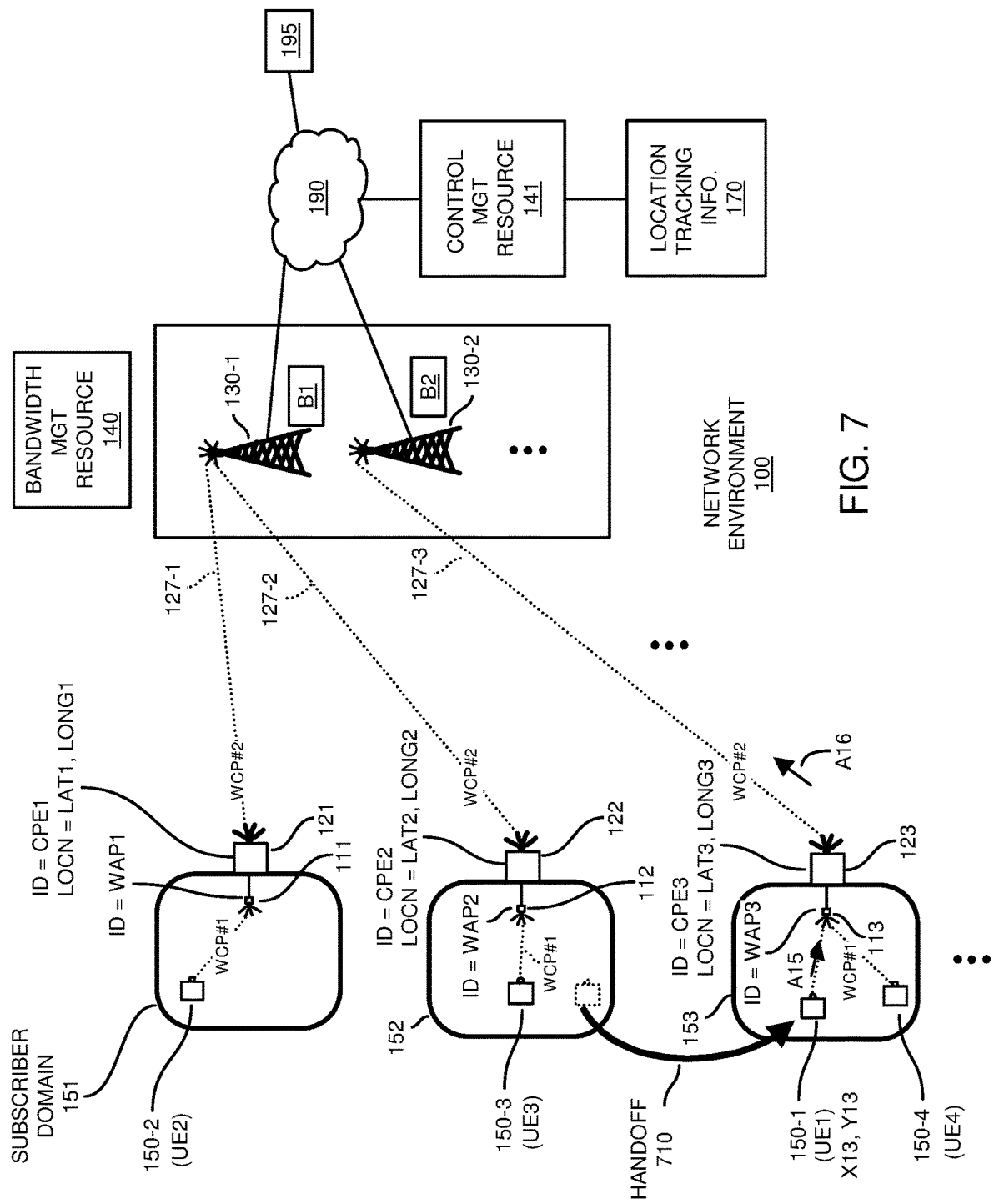
FIG. 7 is an example diagram illustrating a handoff and updated tracking of a mobile communication device according to embodiments herein.

FIG. 7 is an example diagram illustrating a handoff and tracking of a mobile communication device according to embodiments herein.

As previously discussed, as needed, the wireless base stations 130 buffer data, via buffers B1 and B2) associated with the mobile communication devices in a case of a respective handoff.

For example, assume that the mobile communication device 150-1 moves from subscriber domain 152 to subscriber domain 153 as shown in FIG. 7. In one embodiment, the mobile communication device 150-1 and/or wireless access points 112/113 initiate a handoff in response to detecting that the wireless access point 113 is able to provide a better wireless connection to the mobile communication device 150-1 than wireless access point 112.

In one embodiment, the buffer B1 and/or B2 stores communication session information associated with a communication session between the wireless base station 130-1 and the mobile communication device 150-1. For example, after termination of the wireless with the wireless station 130-1 through the wireless station 122, the wireless base station 130-2 buffers data (via buffer B2) associated with the communication session. After the handoff 710, and the mobile communication device 150-1 establishing the wireless communication link (via respective wireless connectivity supporting the wireless communication protocol WCP1) with the wireless access point 113, the wireless base station 130-2 communicates buffered data in buffer B2 associated with the communication session to the mobile communication device 150-1.

In a similar manner as previously discussed, the mobile communication device 150-1 communicates updated location information to the wireless access point 113 via communication A15. The wireless station 123 communicates the updated location information to the wireless base station 130-1 via communication A16.

Figure 8:
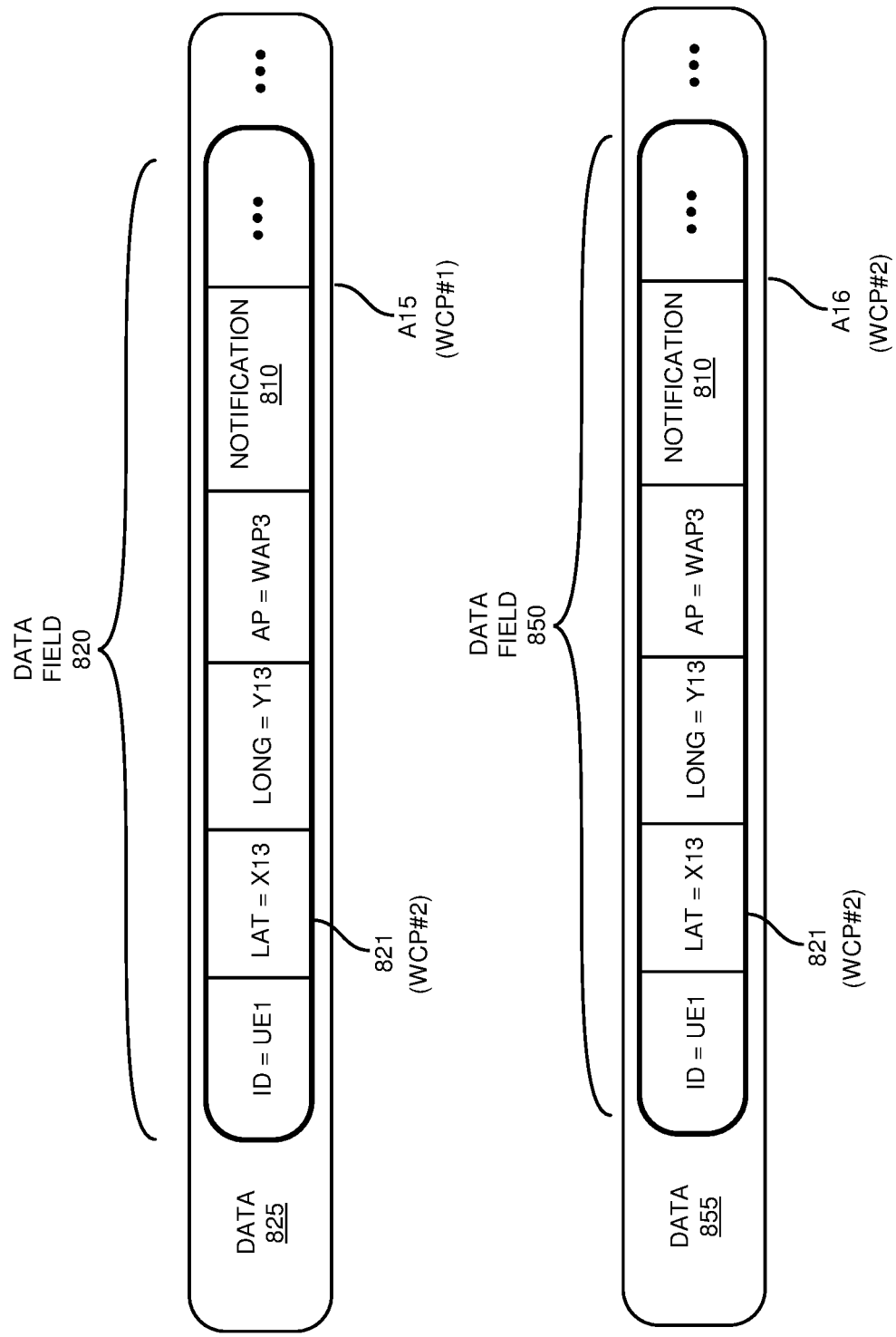
FIG. 8 is an example diagram illustrating wireless communications according to embodiments herein.

FIG. 8 is an example diagram illustrating wireless communications according to embodiments herein.

This example embodiment illustrates details of communications A15 and A16.

Communication A15 (wirelessly transmitted from the mobile communication device 150-1 to the wireless access point 113) is encoded in accordance with wireless communication protocol WCP1 and includes data field 820 as well as supplemental data 825 (such as source information, destination information, header information, etc., for routing).

Data field 820 can be tagged to indicate presence of message 821; data field 820 can be a portion of the communication A15 reserved for location tracking information, etc.

In this example embodiment, the mobile communication device 150-1 populates the data field 820 to include a message 821 (such as encoded in accordance with an LTE or second wireless communication protocol, WCP2) enabling location tracking of the mobile communication device 150-1. More specifically, the mobile communication device 150-1 originating the communication A15 populates the data field 820 (message 821 encoded in accordance with the second wireless communication protocol WCP2) to include an identity of the mobile communication device 150-1 (i.e., identity=UE1), location information such as latitude=X13 and longitude=Y13 indicating a current location of the mobile communication device 150-1 in subscriber domain 153, an identity of a respective wireless access point (namely, WAP3) to which the mobile communication device 150-1 is wirelessly connected, and notification 810.

As previously discussed, note again that the location information can be any suitable information. In one embodiment, the mobile communication device 150-1 include circuitry to generate respective location information such as GPS (Global Positioning System) information indicating a current location of the mobile communication device 150-1.

Communication A16 (wirelessly transmitted from the wireless station 123 to the wireless base station 130-2) is encoded in accordance with wireless communication protocol WCP2 and includes data field 850 as well as supplemental data 855 (such as source information, destination information, etc., for routing).

Data field 850 can be tagged to indicate presence of message 821; data field 850 can be a portion of the communication A16 reserved for location tracking information, etc.

In this example embodiment, the mobile communication device 150-1 populates the data field 850 of communication A16 to include the message 821 (location tracking information such as encoded via an LTE or second wireless communication protocol, WCP2) retrieved from the received communication A15. The data field 850 in the communication A16 includes an identity of the mobile communication device 150-1 (i.e., identity=UE1), location information such as latitude=X13 and longitude=Y13 indicating a current location of the mobile communication device 150-1, an identity of a respective wireless access point (namely, WAP3) to which the mobile communication device 150-1 is wirelessly connected, and notification 810.

Upon receipt of the communication A16, the wireless base station 130-1 detects, via notification 210 set to YES, that the message 821 in communication A16 is decodable in accordance with the second wireless communication protocol WCP2. In such an instance, because the message 821 is detected as being decodable, the wireless base station 130-1 (such as CBSD) retrieves the respective message 821 and decodes it based on the wireless communication protocol WCP2 (such as LTE or other suitable wireless communication protocol). Based on decoding and analysis, the wireless base station 130-2 learns of location tracking information such as: i) a current location (X13, Y13) of the mobile communication device 150-1, ii) wireless access point (WAP3) to which the mobile communication device 150-1 is wirelessly connected, etc.

The wireless base station 130-2 communicates the retrieved information associated with message 821 in data field 550 or message 821 itself to the communication management resource 141. Communication management resource 141 uses the received information associated with message 821 to produce/update the location tracking information 170 as shown in FIG. 9 in a similar manner as previously discussed.

Figure 9:
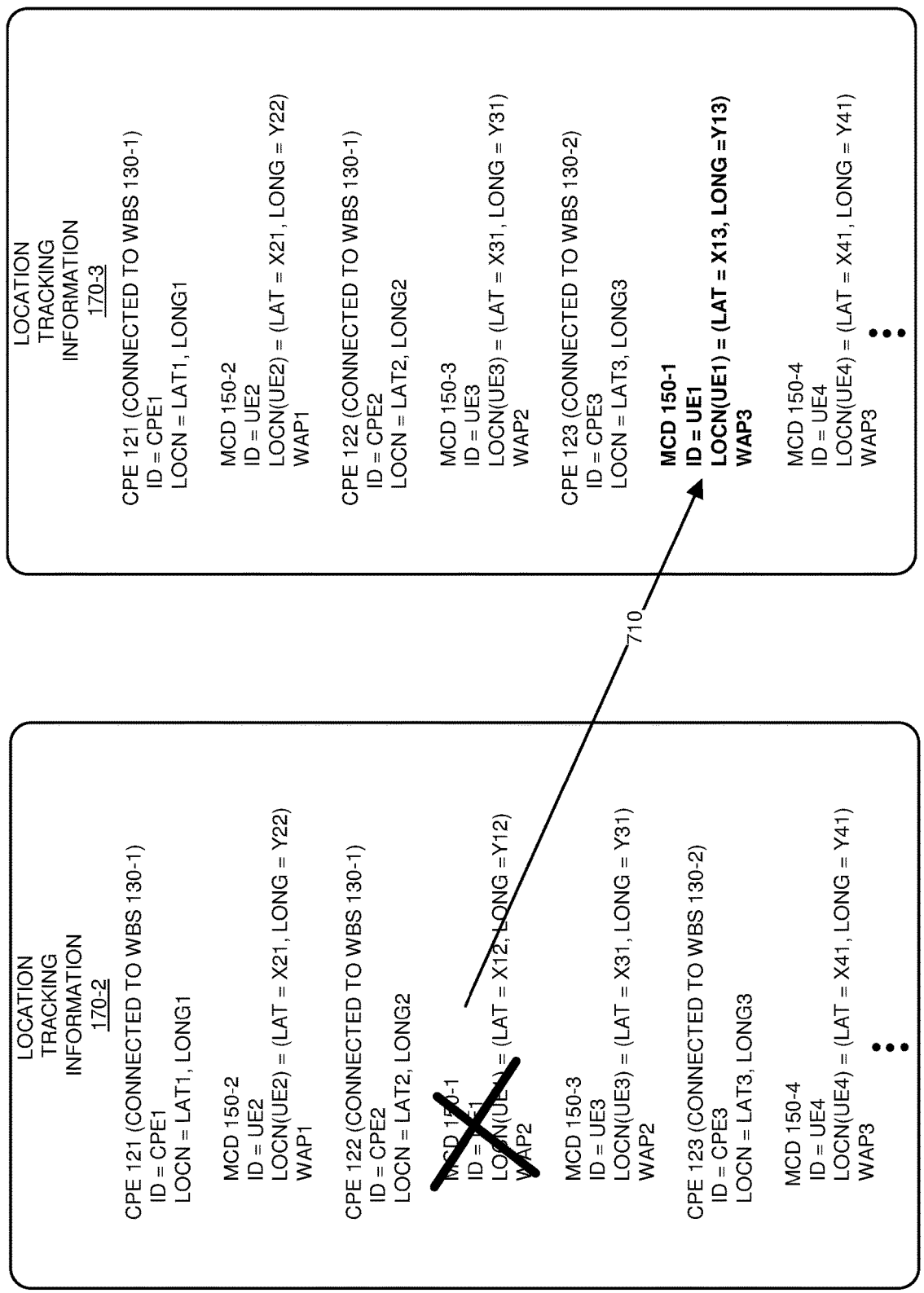
FIG. 9 is an example diagram illustrating updating of location tracking information according to embodiments herein.

FIG. 9 is an example diagram illustrating updating of location tracking information according to embodiments herein.

In a similar manner as previously discussed, via information received from the wireless base stations, the communication management resource 141 produces location tracking information 170-3 associated with the mobile communication devices.

In this example embodiment, the location tracking information 170-3 indicates that the wireless station 121 (such as first customer premises equipment having identity=CPE1) is wirelessly connected to the wireless base station 130-1, the wireless station 122 (such as first customer premises equipment having identity=CPE2) is wirelessly connected to the wireless base station 130-1, the wireless station 123 (such as first customer premises equipment having identity=CPE1) is wirelessly connected to the wireless base station 130-2, and so on.

The location tracking information 170-3 further indicates the update condition in which the mobile communication device 150-1 (UE1) at new location latitude=X13 and longitude=Y13 is connected to wireless access point 113 (WAP3) in subscriber domain 153. Thus, via update of the location tracking information 170-2 to location tracking information 170-3, the communication management resource 141 tracks the new location and corresponding connectivity of the mobile communication device 150-1.

Thus, via the location tracking information 170-3, the communication management resource 141 knows that the mobile communication device 150-1 resides at location X13, Y13; the communication management resource 141 further knows that the mobile communication device 150-1 is connected to the wireless access point 113; the communication management resource 141 further knows that communications associated with the mobile communication device 150-1 are supported via the wireless station 123 through wireless base station 130-2.

Figure 10:
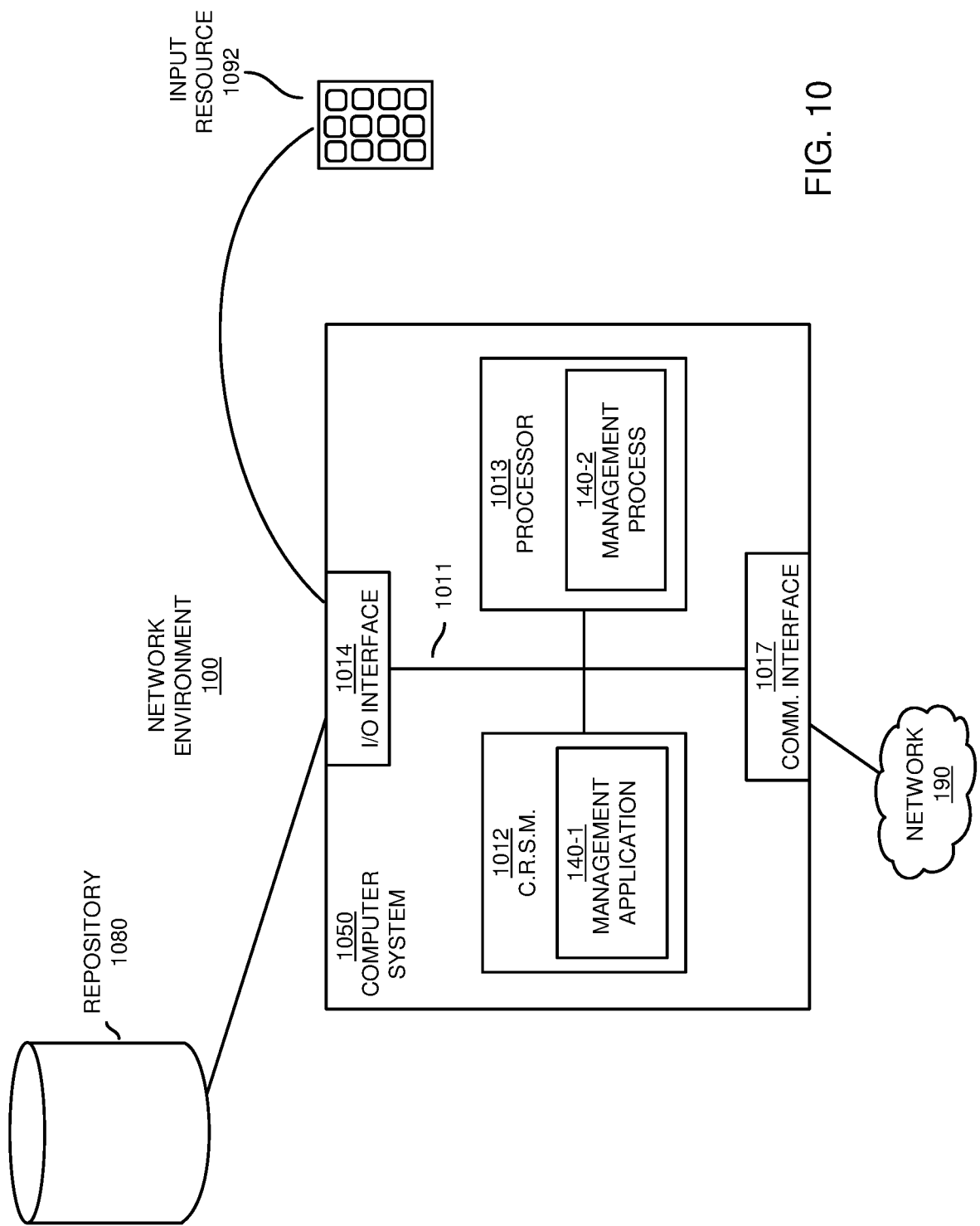
FIG. 10 is an example diagram illustrating example computer architecture operable to execute one or more operations according to embodiments herein.

FIG. 10 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions to carry out the different operations as discussed herein.

As shown, computer system 1050 of the present example includes an interconnect 1011 that coupling computer readable storage media 1012 such as a non-transitory type of media (which can be any suitable type of hardware storage medium in which digital information can be stored and retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with management application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in management application 140-1 stored on computer readable storage medium 1012. Execution of the management application 140-1 produces management process 140-2 to carry out any of the operations and/or processes as discussed herein.

Those skilled in the art will understand that the computer system 1050 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 11 and 12. Note that the steps in the flowcharts below can be executed in any suitable order.

Figure 11:
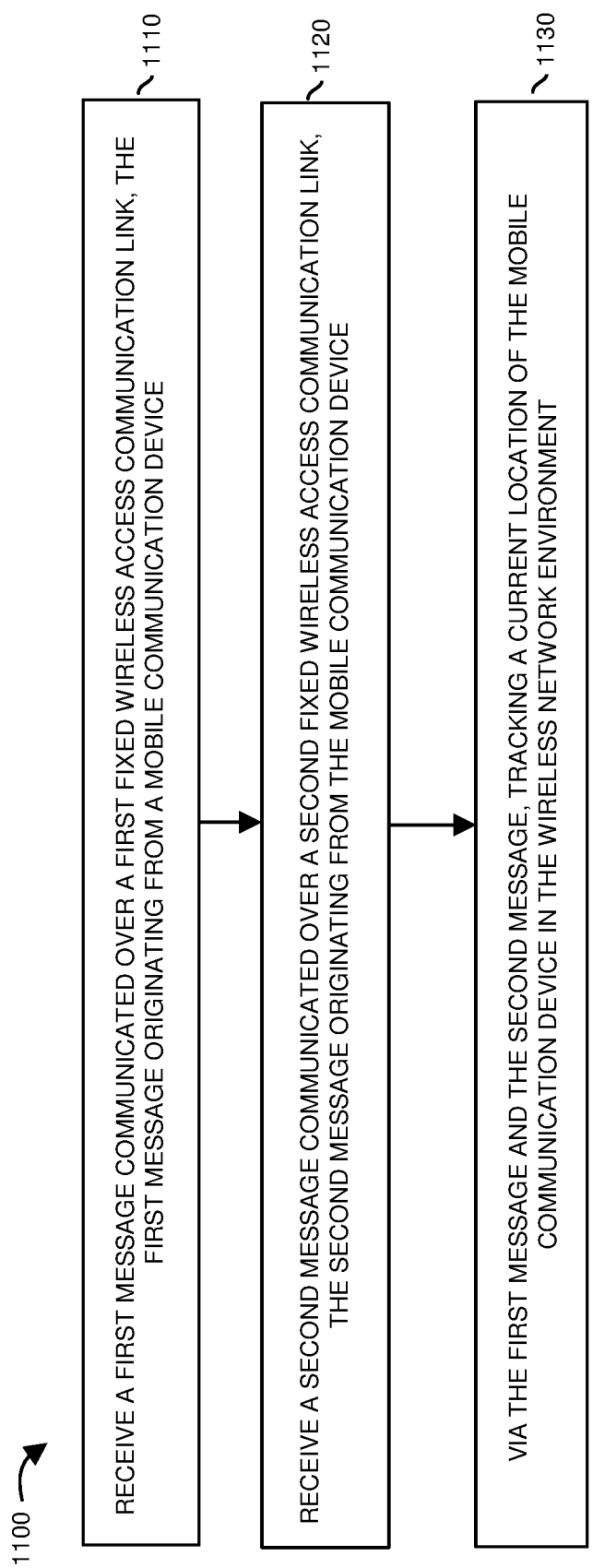
FIG. 11 is an example diagram illustrating a method according to embodiments herein.

FIG. 11 is a flowchart 1100 illustrating an example method according to embodiments. Note that there will be some overlap with respect to concepts as discussed above.

In processing operation 1110, the wireless base station 130-1 receives a first message 221 (in communication A11) communicated over a first (fixed) wireless access communication link 127-1. The first message 221 originates from mobile communication device 150-1.

In processing operation 1120, the wireless station 130-1 (or wireless base station 130-2) receives a second message 521 communicated over a second fixed wireless access communication link 127-2. The second message 521 originates from the mobile communication device 150-1.

In processing operation 1130, via the first message 221 and the second message 521, the wireless base station 130-1 tracks a current location of the mobile communication device 150-1 in the wireless network environment.

Figure 12:
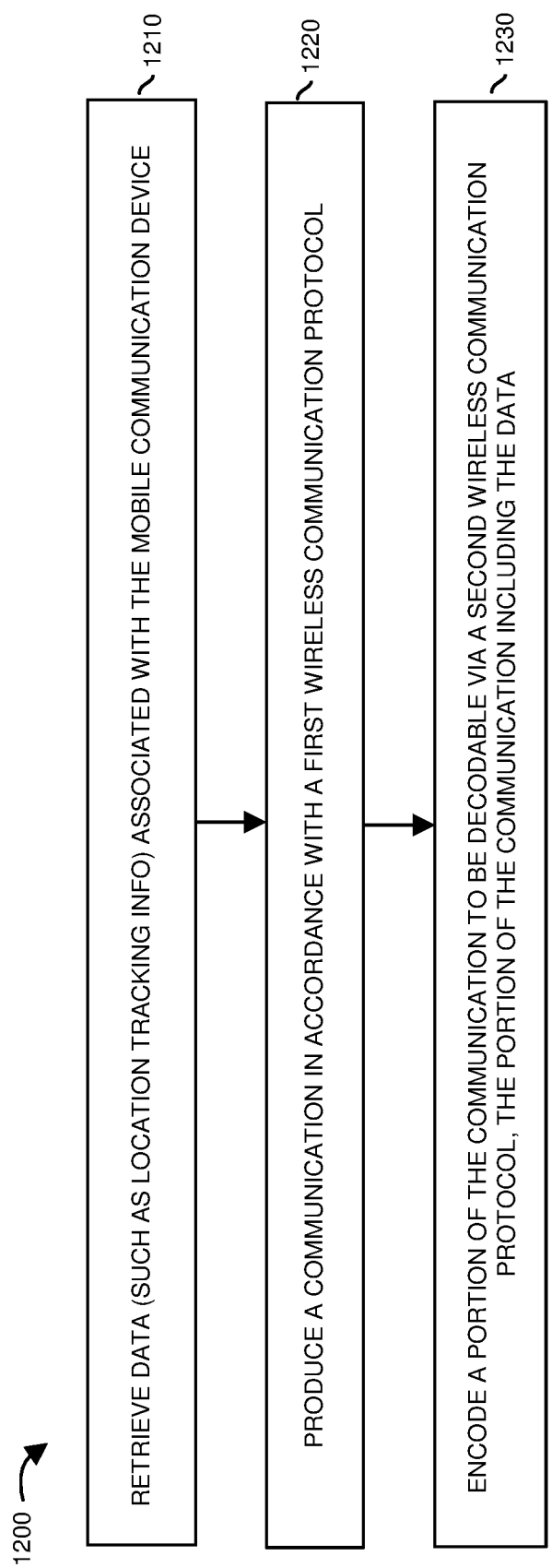
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, a communication management resource in a respective mobile communication device 150-1 retrieves data (such as location data) associated with the mobile communication device 150-1.

In processing operation 1220, the communication management resource of the mobile communication device 150-1 produces a communication A11 in accordance with a first wireless communication protocol (such as WCP1).

In processing operation, 1230, the communication management resource of the mobile communication device 150-1 encodes a portion (such as a data field 220) of the communication A11 to be decodable via a second wireless communication (such as WCP2). The portion (such as data field) of the communication 220 includes the retrieved data or location tracking information such as one or more types of information such as identity=UE1 of the mobile communication device 150-1, latitude=X11, longitude=Y11, access point=WAP1, notification 210, etc.

Note again that techniques herein are well suited to facilitate improved communication device tracking in a network environment supporting multiple fixed wireless access points. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a base station in a wireless network environment:
   receiving a first message communicated over a first wireless communication link, the first message originating from a mobile communication device that communicates the first message in a data field of a first communication transmitted via a first wireless communication protocol, the first message encoded in accordance with a second wireless communication protocol, the second wireless communication protocol being different than the first wireless communication protocol;
   receiving a second message communicated over a second wireless communication link, the second message originating from the mobile communication device, the second message communicated from the mobile communication device in a data field of a second communication transmitted via the first wireless communication protocol, the second message encoded in accordance with the second wireless communication protocol; and
   via the first message and the second message, tracking a current location of the mobile communication device in the wireless network environment.

2. The method as in claim 1 further comprising:
   from the first message: i) detecting that the mobile communication device resides at a first location, and ii) communicating notification of the first location and a unique identifier value of the mobile communication device from the base station to a communication management resource; and
   from the second message: i) detecting that the mobile communication device resides at a second location, and ii) communicating notification of the second location and the unique identifier value of the mobile communication device from the base station to the communication management resource.

3. The method as in claim 1 further comprising:
   establishing the first wireless communication link between the base station and first customer premises equipment, the first customer premises equipment disposed in a first subscriber domain of the wireless network environment; and
   establishing the second wireless communication link between the base station and second customer premises equipment, the second customer premises equipment disposed in a second subscriber domain of the wireless network environment.

4. The method as in claim 3, wherein each of the base station, the first customer premises equipment, and the second customer premises equipment register with a bandwidth management resource to communicate in the wireless network environment.

5. The method as in claim 4, wherein the first wireless communication link and the second wireless communication link support wireless communications in accordance with the second wireless communication protocol; and
   wherein the first customer premises equipment and the second customer premises equipment support wireless communications in accordance with the second wireless communication protocol.

6. The method as in claim 1, wherein the first message includes: i) a unique identifier value assigned to the mobile communication device, and ii) first location information indicating a first location in which the mobile communication device resides at a first instant in time; and
   wherein the second message includes: i) the unique identifier value assigned to the mobile communication device, and ii) second location information indicating a second location in which the mobile communication device resides at a second instant in time.

7. The method as in claim 1, wherein the first communication includes an indication that the first message includes data decodable via the second wireless communication protocol.

8. The method as in claim 7, wherein the first message includes: i) a unique identifier value assigned to the mobile communication device, and ii) location information indicating the current location of the mobile communication device in the wireless network environment.

9. The method as in claim 1 further comprising:
   initiating a handoff of the mobile communication device from first customer premises equipment to second customer premises equipment, the first customer premises equipment in communication with the base station over the first wireless communication link, the second customer premises equipment in communication with the base station over the second wireless communication link.

10. The method as in claim 9 further comprising:
    initiating the handoff in response to detecting movement of the mobile communication device from a first region of wireless coverage provided by the first customer premises equipment to a second region of wireless coverage provided by the second customer premises equipment.

11. The method as in claim 1, wherein the first message is communicated over the first wireless communication link via the second wireless communication protocol; and
    wherein the second message is communicated over the second wireless communication link via the second wireless communication protocol.

12. The method as in claim 11 further comprising:
    receiving the first message over the first wireless communication link from first customer premises equipment that receives the first communication from the mobile communication device and communicates the first message in a data field of a communication transmitted from the first customer premises equipment to the base station over the first wireless communication link; and
    receiving the second message over the second wireless communication link from second customer premises equipment that receives the second communication from the mobile communication device and communicates the second message in a data field of a communication transmitted from the second customer premises equipment to the base station over the second wireless communication link.

13. The method as in claim 12, wherein the data field of the communication transmitted from the first customer premises equipment over the first wireless communication link is tagged to indicate presence of the first message; and
    wherein the data field of the communication transmitted from the second customer premises equipment over the second wireless communication link is tagged to indicate presence of the second message.

14. The method as in claim 12, wherein the first wireless communication protocol is a non-LTE (Long Term Evolution) wireless communication protocol; and
    wherein the second wireless communication protocol is LTE (Long Term Evolution) decodable.

15. The method as in claim 12, wherein tracking the current location of the mobile communication device in the wireless network environment includes:
 decoding the first message, the first message indicating that the mobile communication device resides at a first location at a first instant in time; and
 decoding the second message, the second message indicating that the mobile communication device resides at a second location at a second instant in time.

16. The method as in claim 12, wherein tracking the current location of the mobile communication device includes:
 retrieving an identity of the mobile communication device and a first location of the mobile communication device from the first message; and
 retrieving the identity of the mobile communication device and a second location of the mobile communication device from the second message.

17. The method as in claim 1, wherein the first message indicates that the mobile communication device resides at a first location and is in communication with first customer premises equipment providing first wireless connectivity to the mobile communication device; and
 wherein the second message indicates that the mobile communication device resides at a second location and is wirelessly connected to second customer premises equipment providing second wireless connectivity to the mobile communication device.

18. The method as in claim 1 further comprising:
 receiving the first message over the first wireless communication link from first customer premises equipment that: i) wirelessly receives the first communication from the mobile communication device via the first wireless communication protocol and ii) communicates the first message in a data field of a communication transmitted from the first customer premises equipment to the base station over the first wireless communication link via the second wireless communication protocol; and
 receiving the second message over the second wireless communication link from second customer premises equipment that: i) wirelessly receives the second communication from the mobile communication device via the first wireless communication protocol, and ii) communicates the second message in a data field of a communication transmitted from the second customer premises equipment to the base station over the second wireless communication link via the second wireless communication protocol.

19. The method as in claim 18, wherein each of the base station, the first customer premises equipment, and the second customer premises equipment register with a bandwidth management resource to receive allocation of CBRS (Citizen Band Radio System) channel resources to establish the first wireless communication link and the second wireless communication link.

20. The method as in claim 1, wherein tracking the current location of the mobile communication device in the wireless network environment includes:
 at the base station: i) decoding the first message via the second wireless communication protocol, the first message indicating that the mobile communication device resides at a first location at a first instant in time, and ii) decoding the second message via the second wireless communication protocol, the second message indicating that the mobile communication device resides at a second location at a second instant in time.

21. A system comprising:
 a base station disposed in a wireless network environment, the base station operative to:
  receive a first message communicated over a first wireless communication link, the first message originating from a mobile communication device that communicates the first message in a data field of a first communication transmitted via a first wireless communication protocol, the first message encoded in accordance with a second wireless communication protocol, the second wireless communication protocol being different than the first wireless communication protocol;
  receive a second message communicated over a second wireless communication link, the second message originating from the mobile communication device, the second message communicated from the mobile communication device in a data field of a second communication transmitted via the first wireless communication protocol, the second message encoded in accordance with the second wireless communication protocol; and
  via the first message and the second message, track a current location of the mobile communication device in the wireless network environment.

22. The system as in claim 21, wherein the base station is further operative to:
 from the first message: i) detect that the mobile communication device resides at a first location, and ii) communicate notification of the first location and a unique identifier value of the mobile communication device from the base station to a communication management resource; and
 from the second message: i) detect that the mobile communication device resides at a second location, and ii) communicate notification of the second location and the unique identifier value of the mobile communication device from the base station to the communication management resource.

23. The system as in claim 21, wherein the base station is further operative to:
 establish the first wireless communication link between the base station and first customer premises equipment, the first customer premises equipment disposed in a first subscriber domain at a first location of the wireless network environment; and
 establish the second wireless communication link between the base station and second customer premises equipment, the second customer premises equipment disposed in a second subscriber domain at a second location of the wireless network environment.

24. The system as in claim 23, wherein each of the base station, the first customer premises equipment, and the second customer premises equipment register with a bandwidth management resource to communicate in the wireless network environment.

25. The system as in claim 24, wherein the first customer premises equipment and the second customer premises equipment support wireless communications with the mobile communication device in accordance with the first wireless communication protocol; and
 wherein the first wireless communication link and the second wireless communication link support wireless communications in accordance with the second wireless communication protocol.

26. The system as in claim 21, wherein the first message from the mobile communication device is encoded and communicated from the mobile communication device in accordance with the first wireless communication protocol to a first wireless station that communicates the first message through the first customer premises equipment over the first wireless communication link in accordance with the second wireless communication protocol to the base station; and wherein the second message from the mobile communication device is encoded and communicated from the mobile communication device in accordance with the first wireless communication protocol to a second wireless station that communicates the second message through the second customer premises equipment over the second wireless communication link in accordance with the second wireless communication protocol to the base station.

27. The system as in claim 26, wherein a portion of the first message communicated via the first wireless communication protocol from the mobile communication device to the first wireless station is encoded in accordance with the second wireless communication protocol; and wherein a portion of the second message communicated via the first wireless communication protocol from the mobile communication device to the second wireless station is encoded in accordance with the second wireless communication protocol.

28. The system as in claim 27, wherein the portion of the first message includes: i) a unique identifier value assigned to the mobile communication device, and ii) location information indicating a first location at which the mobile communication device resides; and wherein the portion of the second message includes: i) the unique identifier value assigned to the mobile communication device, and ii) location information indicating a second location at which the mobile communication device resides.

29. The system as in claim 21, wherein the mobile communication device communicates the first message in a first communication encoded in accordance with the first wireless communication protocol, the first message including a notification indicating that the first message in the first communication is decodable via a second wireless communication protocol.

30. The system as in claim 29, wherein the first message includes: i) a unique identifier value assigned to the mobile communication device, and ii) location information indicating a current location of the mobile communication device in the wireless network environment.

31. The system as in claim 21, wherein the base station is further operative to:

facilitate a handoff of the mobile communication device from first customer premises equipment to second customer premises equipment, the base station in communication with the first customer premises equipment over the first wireless communication link, the base station in communication with the second customer premises equipment over the second wireless communication link.

32. The system as in claim 31, wherein the base station is further operative to:

initiate the handoff in response to detecting movement of the mobile communication device from a first region of wireless coverage provided by the first customer premises equipment to a second region of wireless coverage provided by the second customer premises equipment.

33. The system as in claim 21, wherein first customer premises equipment resides in a first subscriber domain; and wherein second customer premises equipment resides in a second subscriber domain.

34. The system as in claim 21, wherein the first message originates from the mobile communication device and is communicated from the mobile communication device in a data field of a first communication transmitted via the first wireless communication protocol from the mobile communication device to the first customer premises equipment, the first message encoded in accordance with a second wireless communication protocol; and wherein the second message originates from the mobile communication device and is communicated from the mobile communication device in a data field of a second communication transmitted via the first wireless communication protocol from the mobile communication device to the second customer premises equipment, the second message encoded in accordance with the second wireless communication protocol.

35. The system as in claim 34, wherein the base station is operative to:

receive the first message over the first wireless communication link from the first customer premises equipment via the second wireless communication protocol; and receive the second message over the second wireless communication link from the second customer premises equipment via the second wireless communication protocol.

36. Computer-readable storage hardware having instructions stored thereon, the instructions, when carried out by computer processor hardware, cause the computer processor hardware to:

receive a first message communicated over a first wireless communication link, the first message originating from a mobile communication device that communicates the first message in a data field of a first communication transmitted via a first wireless communication protocol, the first message encoded in accordance with a second wireless communication protocol, the second wireless communication protocol being different than the first wireless communication protocol;

receive a second message communicated over a second wireless communication link, the second message originating from the mobile communication device, the second message communicated from the mobile communication device in a data field of a second communication transmitted via the first wireless communication protocol, the second message encoded in accordance with the second wireless communication protocol; and via the first message and the second message, track a current location of the mobile communication device in a wireless network environment.

\* \* \* \* \*